7474X

J. Leland.
Loom.

Patented Mar. 9, 1833.

John Leland of Millbury Massachusetts,
Letters Patent

The Schedule referred to in these Letters Patent and making part of the same
containing a description in the words of the said John Leland himself of
his improvement in the construction of Broad Power Looms for weaving plain and
Twilled cloth.

To all people to whom these presents shall come.

Be it known, that I John Leland of Millbury in the County of Worcester,
and Commonwealth of Massachusetts, machinist, have invented a new and
useful improvement in the construction of Broad Power Looms, called the
improved Shuttlemotion Loom, for weaving plain and twilled cloths, and
that the following is a full and exact description of the construction and
operation of said machine as improved by me, and in the words follow
ing, to wit: The frame of the machine may be made of any material suit
ably firm and strong; it should be long enough to receive the desired width
of the cloth to be wove, and wide enough to admit the Lathe to vibrate
and the harness to open the warp for the passage of the shuttle.
The ends of my machine are constructed of cast iron, each end consisting of
two posts and two girts, one about ten inches above the other.
The lower girts are crooked, projecting into the frame of the loom about
six inches. The sides of the frame consist of a Breast beam, Dead Beam,
Back and Front Girts. There are two cast iron cross bars, placed at equal
distances from the centre of the frame and resting on the front and back
girts. There is a shaft of iron called the Lathe Shaft, extending the length
of the frame; the ends resting in Boxes on the crooked girts at each end
of the frame, and the middle resting on one of the cross bars. On each end
of this L. the shaft is a crank and near the middle of it, and firmly at-
tached to it is a large cog wheel. This cog wheel as you stand in front
of the frame, is near the left side of the left cross bar. Between this
cog wheel and the left cross bar, and firmly attached to the lathe shaft
is a pinion. This is the small pinion. There is another pinion called the
large pinion, which is so constructed as to slip directly on over the small
one, and contains the small one within it, and may be put on or taken off at the pleasure of the operator. They are so fastened together, that when one revolves the other revolves in the same manner. There is a short shaft bearing the cams, having its ends resting in Boxes on the cross bars, and is called the cam shaft. Upon this shaft are cams which move the treadles and the harness, and vary in number according to the cloth to be wove.

The small pinion contains twelve cogs or leaves, and the large pinion twenty two. on the left end of the cam shaft is, a cog wheel of forty four cogs, called the cam wheel, which plays into the leaves, of the large pinion.

There is another shaft called the driving shaft, extending from the end of the frame on the right to the left cross bar. The end on the right rests in a box placed on the top girt in the right hand end of the frame, and the other rests on a standard erected on and firmly attached to the left cross bar, on the left end of this driving shaft is a pinion, the leaves of which play into the cogs, of the cog wheel attached to the lathe shaft. On the other end of this driving ~~wheel~~ shaft is, a fast, and loose pulley for the purpose by means of a belt or band, of connecting the loom with the moving power. The lathe is made mostly of wood and of sufficient length to contain the shuttle boxes at the ends. The lathe is suspended on lathe standards at each end. These standards are of cast iron and at the bottom turn on pivots or hinges for the purpose of giving the lathe a vibrating motion. The pivots or hinges, one at each end of the frame, are on parts projecting from the feet of the front posts into the frame. Near the top of the standard is, an arm which is attached to it, and extending downward to the crank on the lathe shaft. At the foot of the standard is, another arm, extending upward, also to the crank on the lathe shaft. This lower arm is called a vibrating cam. The top end of this vibrating cam is connected to the lower end of the arm first mentioned by means of a bolt. At the top end of this vibrating cam is, a slot or mortise, of a circular form and receives the end of the crank on the lathe shaft. The standards and vibrating cams are alike at each end of the machine. There is a spring placed between the lower end of the arm extending from the top of the lathe standard and the upper end of the vibrating cam for the purpose of accommodating a gravel yarn Beam, with which the loom is contemplated to be finished. It is
not intended however to be used when the loom is worked with a com-
mon wire or leather friction, but when it is thus worked, they may
be screwed up fast together. On the left hand side of the large cog
wheel is inserted a pin called the stud roller, and is confined in
a slot, and moveable at pleasure. The office of this is to throw the shuttle;
Near the cog wheel on the lathe shaft, at the left of it is the picker or shut-
tle treadle. This hangs on a hinge attached to the back side of the frame;
Upon this treadle and directly against the lowest point in the cog wheel is,
attached the picker shoe. This shoe presents an inclined plane, and re-
ceives the stud Roller as the cog wheel revolves. Near the hinge of the
treadle is a wire or spiral spring contained in a tube or barrel, after
the manner of the patent balance, attached to the frame at the upper
end, and the lower end attached to the treadle; to raise the treadle back
to its place, after it has been depressed by the stud roller: Two swing
staff pulleys, are placed in the fore part of the machine, at equal
distances from the centre of the Loom, the one on the left being nearly over
the Picker treadle, the other about two feet from it at the right. A small
friction Roller or pulley is placed between these two pulleys but nearer to
the left pulley than the other, being at a distance a little more than the
thickness of the end of the Picker treadle. A [illegible] or band of [illegible] is fastened to the projecting end of the picker treadle. One end of the strap is confined
to one of the pulleys on the outward side of it and passes over the friction
pulley to where it is confined, as mentioned above to the treadle, and then
to the outward side of the other pulley where it is also fastened. The swing staves
are firmly attached to the two outside pulleys mentioned before. At the up-
per ends of these staves are attached strings or cords connected at the other
ends to the pickers that throw the shuttle. Between the cross bars are the tread-
les hanging on hinges at the backside of the Loom. The treadles are con-
nected to the harness by means of strings or wires, and the harness is
suspended from the harness Roller. On the front side of the Loom is the cloth
beam, accommodated on the left hand end, with a ratchet wheel which is mo-
ved forward by a dog and thus the cloth is taken up as fast as it is wove.

Explanation of the Drawings 344 74744 4

Fig 1 Represents an end view of the Loom. A A the frame.

a. End view of the Lathe Shaft.

b.b. Treadles c.c. The large cogwheel on the Lathe shaft. a.

d. The Roller shoe on the picker or shuttle treadle x.

e. The large pinion on the Lathe shaft.

f. The end of the Yarn Beam.

g. The end of the driving shaft h. Arm connecting the top of the standard to the vibrating cam.

i. The pinion on the end of the driving shaft g.

j. The end of the Lathe k. The Lathe Standard l. The vibrating cam.

m. ..... Spring n. The bolt by which the vibrating cam l is confined to the arm h attached to the Standard K o. The stud roller in the cog wheel c.c.

p p. Cams for the treadles b.b.

q. Slot in the cog wheel c. c.

r. The end of the crank in the circular slot s.

s. Circular slot in the vibrating cam l.

t. Box for one end of the cam shaft.

u. Cog wheel attached to the cam shaft w.w. Ends of the Harness.

x. Picker or shuttle treadle y. The end of the cloth beam in the front of the loom.

z. Ratch wheel on the cloth beam.

a.a. Leather Band passing over the sway staff.

c.c. Sway staff to throw the shuttle.

w. Shoe resting on the treadle, to receive one of the cams which forces the Treadle downward.

d.d. Foot of one of the Lathe standards, turning on a pivot f.f. Spiral spring to raise the picker treadle after it has been forced down by the Stud Roller.

Explanation of the drawing

Fig II. Represents a front view of the Loom: B.B.B. The frame.
a. Lathe Shaft
bb. Ends of the Treadles.
c.c. Large Cog wheel on the Lathe Shaft a
d. Small friction Roller.
e String connecting the Picker to the swag Staff q.
ff Cams for moving the Treadles
g Driving Shaft.
h Swag Staff.
i. Pinion on the end of the driving Shaft g.
jj Lathe.
kk Lathe Standards.
ll. Pickers at each end of the Lathe.
n.m.t.y. Leather Band attached to the swag staff Pulleys.
y. End of the band where it is attached to the swag staff pulley w.
n. The other end of the Band attached to the other pulley u.
o. Stud Roller in the cog wheel c.
p Standard to support the end of the driving shaft g.
q Swag Staff.
r.r. Cranks at the ends of the Lathe shaft, a.
s.s. Crooked girts supporting the Lathe Shaft a,
u. String connecting the Picker to the Swag staff h.
v.v.v.v. Harness.
w Harness Roller.
x. End of the Picker Treadle.
yy. Loose pulley on the driving Shaft g
nn. Fast or confined pulley on the same shaft.
z.z. Large Pinion on the Lathe shaft, a.

Figure 1:
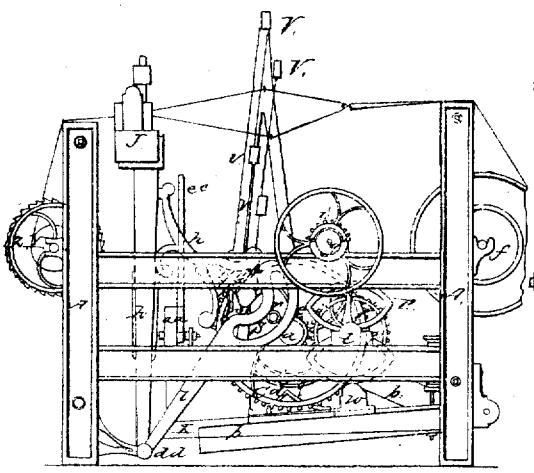

Explanation of the Drawing.

Fig III. Represents the bottom of the Loom in part seen from the top.
A.A. The Lower Side Pieces.
a. The Lathe Shaft.

b. The Place where the Lathe shaft rests on the cross bar. d c.c. The large cog wheel on the Lathe shaft a.

d Crofs Bar.

e.e. Cam Shaft. resting on the crofs bar K. b. d. K.

f Pinion on the Lathe shaft a with 22 Cogs.

g. The part of the crank r. in the circular slot of the vibrating Cam. same as r in fig I.

k. Crofs bar supporting one end of the cam shaft.

o. Stud Roller in the large Cog wheel c.c.

p.p. Cams on the Cam shaft. e.e.

r. Crank on the Lathe shaft a.

s Crooked girt.

t.t. Boxes for the ends of cam shaft e.e.

u. Cog wheel on the Cam shaft e e playing into the pinion f. on the Lathe shaft a.

Operation of the machine.

Figure 3:
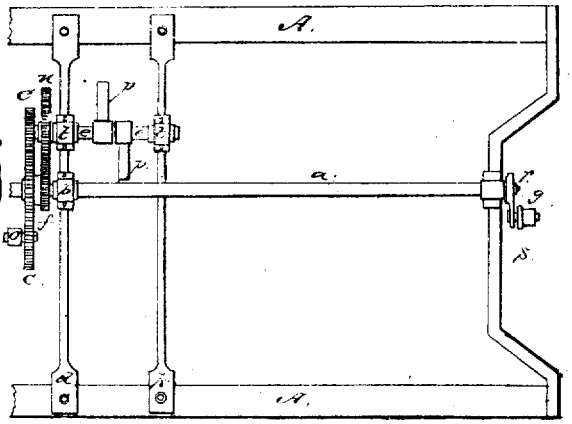
Figure 2:
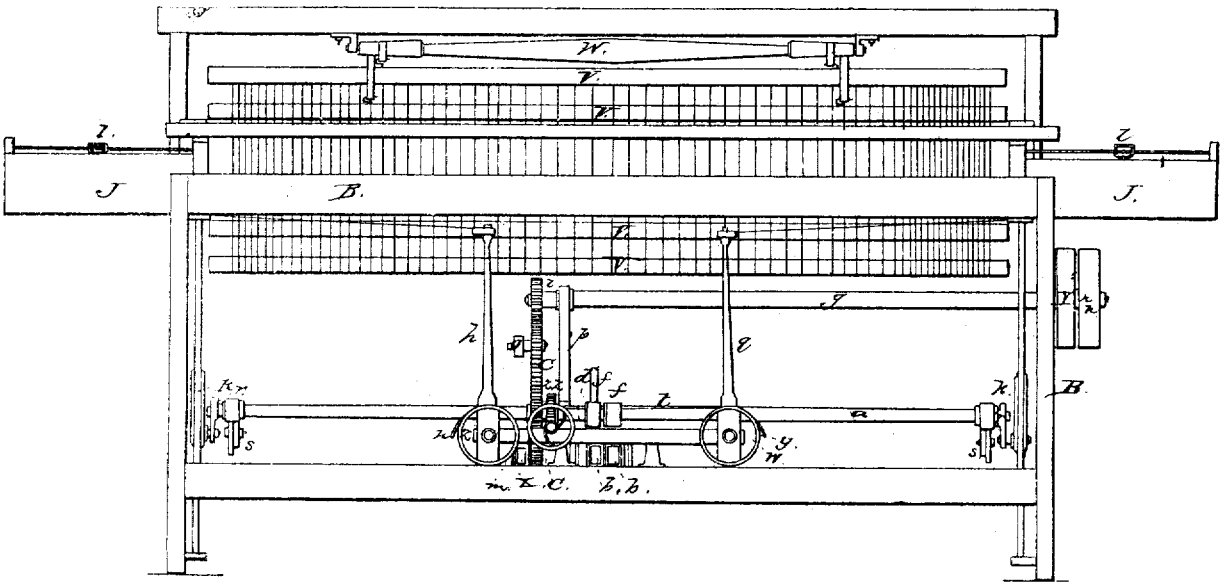

The band passing over y.y. Fig 2 being slipt off upon the fast or confined pulley n.n. the driving shaft. g. Figs 1&2. is made to revolve, and with it the pinion i Figs 1&2. and the leaves of this pinion playing into the large cog wheel c.c. Figs 1. 2&3. the Lathe shaft a in Figs 1.2. & 3. to which the cog wheel c.c is firmly attached is also made to revolve when the Lathe shaft a revolves. the large pinion i Fig I. (same as z.z. in Fig 2 and f in Fig 3.) which is firmly attached to the Lathe shaft, revolves. and the leaves of this pinion playing into the cog wheel u Figs 1&3. on the Cam shaft e.e Fig 3. The large cog wheel u and the cam shaft e.e. are also made to [illegible]. As the Cam shaft e.e Fig 3. revolves. the cams p.p. Figs 1&3. are brought alternately against the treadles b.b. Figs 1&2. and the treadles are alternately depressed and in this way the harness being attached to the treadles the threads of the warp are crossed. When the Lathe shaft a was turned. the cranks r r on each end of it as in Fig 2 were turned also, and these cranks being connected with the vibrating cams 1 Fig 1. by reason of the insertion of the ends of the cranks into the circular slots (3. Fig 1 represents
the circular slot in one of the vibrating cams. and v fig 1. the end of one
of the cranks.) the vibrating cams were depressed, and as the upper
ends of the vibrating cams are united, or connected to the Lathe
Standards k Fig 1. and kk in Fig 2 by means of the arms as
seen at h Fig 1. by means of the bolts as at n Fig 1. the Lathe
Standards k and with it the Lathe j Fig 1. (the Standards at
both ends of the loom being alike, and moved in the same way
and turning on a pivot. as at d. d. Fig 1.) is carried toward the
back of the loom. When the Lathe Shaft a began to revolve,
the large cog wheel c c Figs 1. 2 & 3 revolved with it. and the
Stud roller o. Fig 1. 2. & 3 being attached to the cog wheel c c.
was carried against the inclined plane of the Picker shoe d Fig
1. and forced down and this picker shoe being upon the picker treadle
le a Figs 1 & 2. the treadle was forced downwards also. and
the leather band or Strap n. m. t. y. Fig 2. (same as a a Fig 1.)
the vibrating end of the picker treadle resting on the Strap be-
tween the pulleys t & d Fig 2. was carried down at the
same time, and as this Strap is confined at each end n & y
to the two swag staff pulleys z & w Fig 2. the two pulleys
were both turned towards each other and as the swag staves h
& q. of Fig 2. (same as c.c. Fig 1.) are firmly attached to the pulleys the
swag staves were moved towards each other in the same manner
and by means of the strings u & e Fig 2. attached to the Pickers
i i. Fig 2. the pickers were brought towards each other also.
And by this motion, the shuttle was thrown from one end of the lathe
j j Fig 2. to the other. When the large cog wheel had performed
one revolution, or when the Stud roller had forced down the picker
treadle. and passed by it, the treadle was immediately brought back
to its place by means of the Spiral spring contained in the bar-
rel ff. Fig 1. and this left the end of the Strap on the pulley t Fig
2. loose. So that the force with which the shuttle was driven.
from the right hand end of the lathe j Fig 2. to the other end will carry the picker into the other end of the lathe to the end of it - which by means of the string u Fig 2. will turn the swag staff k Fig 2. to the left and this will bring the strap tight and prepare it to throw the shuttle back when the stud roller shall again force down the picker treadle.

The harnesses are drawn up and down v.v.v.v. in Figs 1 & 2. by one side of each being connected with each of the treadles as in Fig 2. at each revolution of the Lathe shaft. the Lathe is carried forward and back by means of the cranks inserted into the circular slots one of which slots is seen at s. Fig 1. and this motion is such that when the lathe is carried up. it is made to beat up against the cloth rapidly. but when it is carried back it is less rapid. and when entirely back is almost stationary, which gives sufficient time for the shuttle to pass.

The foregoing description is for weaving plain Cloth; and in order to adapt the loom to weaving Kersey. it is necessary to remove the large pinion from the small one. leaving the small pinion with twelve Cogs in its place. The Cam shaft and cog wheel attached to it are then taken out; and another cam shaft with a wheel of forty eight cogs. and four cams are put in their place. Two additional treadles are also required and another harness Roller. By a similar change of the cam shaft, the number of cams and treadles may be multiplied at pleasure and consequently any kind of double work may be wove and the shuttle motion remain the same.

Improvement Claimed.

In all the power Looms now in use; and especially those for weaving plain Broad cloth. or Broad Kersey the method of driving the Shuttle is by means of stud rollers. inserted into the cams by which the harness is operated. These stud rollers, as they revolve with the cams operate alternately upon treadles called shuttle or picker treadles producing upon them a vibrating motion which is made by means of a pulley and swag staff to operate the shuttle. The usual number of beats or jerks for a Loom weav
ing cloth from ten to twelve quarters wide is forty per minute. and as the
Cams in a loom for plain cloth revolve but half the number of times the
Lathe beats, and but a quarter the number of times for Kersey. the motion
given to the Stud Rollers is very slow which requires the inclined plane of the
picker shoe, where the Stud Rollers are received, to be very steep or abrupt,
in order to give sufficient force to the shuttle, and the motion thus given
to the shuttle is a very hard and unnatural one. producing a trembling and
agitation throughout the whole Loom. To obviate this difficulty and con-
struct a Loom in which the shuttle motion shall remain the same not only
for plain cloth. but for Kersey or any kind of double work, is the object of this
improvement. And what I claim as my improvements consists first in pla-
cing the Lathe Shaft in such position in the Loom, as to admit of its opera-
ting not only the vibrating cams. but of its driving the shuttle.

2° In arranging the vibrating cams to the pivots on which the Lathe
Standards rest, and hanging them on the same.

3° Motioning the shuttle with but one Stud Roller and one picker treadle.

In testimony that the foregoing is a true Specification of my said
improvement, as by me described. I have hereunto set my hand and
seal this twenty fifth day of February in the year of our Lord one —
thousand Eight hundred and thirty three.

Witnesses
Davis Mc Farland
Wm. M. Towne
Christopher Columbus Baldwin

John Leland

Engd.
1146.

(3738 words)

(Patented 9 March 1833.)

Drawing [illegible]